N. E. BEVERLY.
CORN PLANTER.
APPLICATION FILED JULY 7, 1915.

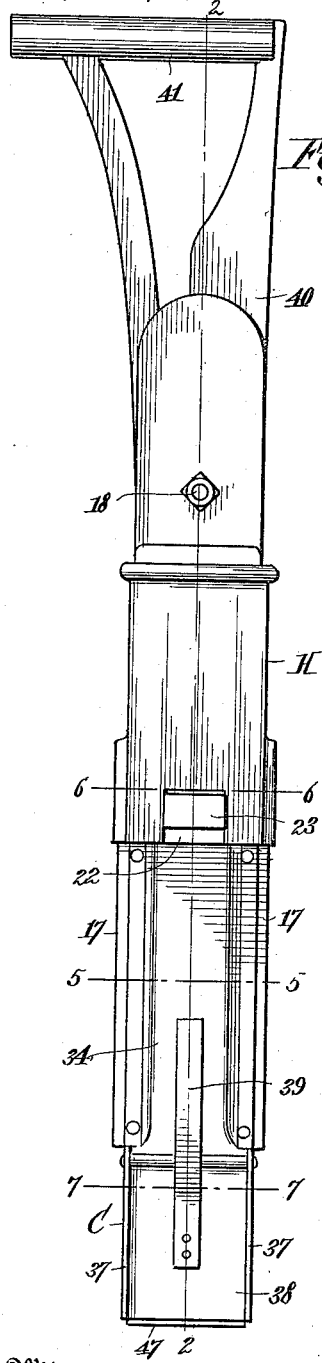
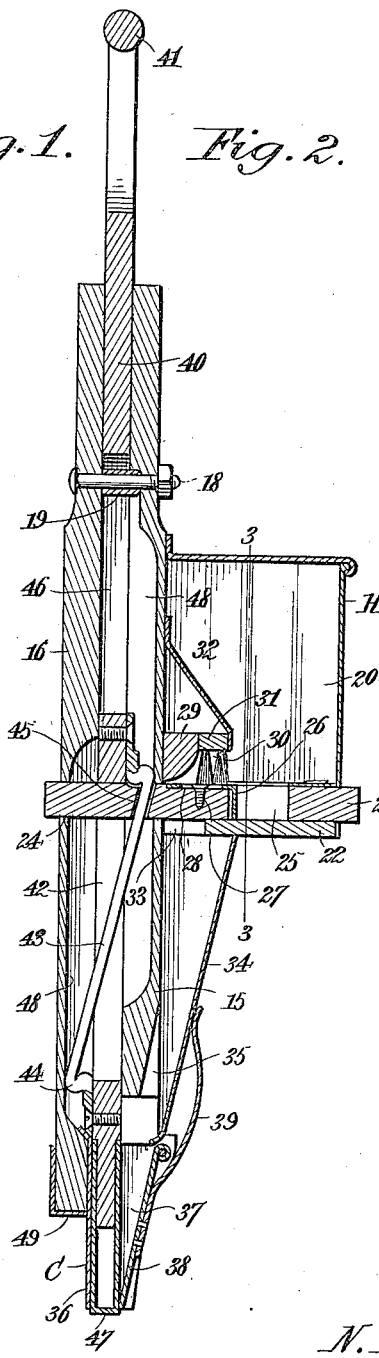
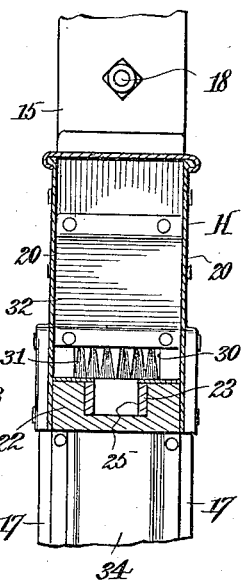

1,172,191.

Patented Feb. 15, 1916.
2 SHEETS—SHEET 2.

Inventor,
N. E. Beverly.

By Victor J. Evans,
Attorney.

UNITED STATES PATENT OFFICE.

NATHAN E. BEVERLY, OF BADEN, VIRGINIA.

CORN-PLANTER.

1,172,191.   Specification of Letters Patent.   Patented Feb. 15, 1916.

Application filed July 7, 1915. Serial No. 38,479.

*To all whom it may concern:*

Be it known that I, NATHAN E. BEVERLY, a citizen of the United States, residing at Baden, in the county of Dickenson and State of Virginia, have invented new and useful Improvements in Corn-Planters, of which the following is a specification.

This invention relates to corn planters, and it has particular reference to hand corn planters.

The invention has for its object to produce a simple and improved corn planter which may be operated with one hand, thereby reducing the labor and strain of operation to a minimum.

A further object of the invention is to simplify and improve the construction and combination of parts constituting the improved planter.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

Figure 4:
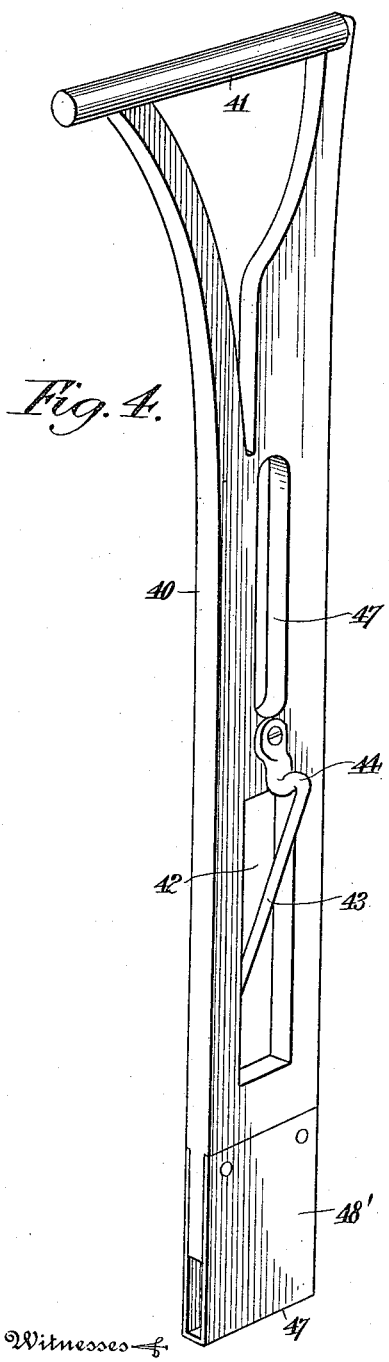
Figure 5:
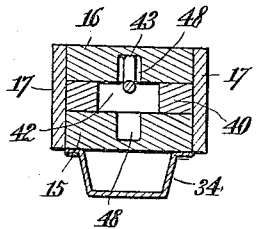
Figure 6:
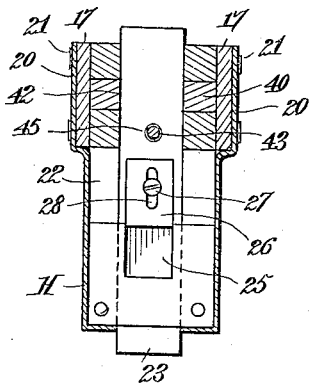
Figure 7:
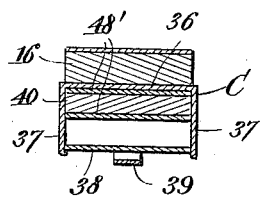

In the drawings, Figure 1 is a front view of the improved planter. Fig. 2 is a vertical sectional view taken on the line 2—2 in Fig. 1. Fig. 3 is a vertical sectional view taken transversely through the hopper on the line 3—3 in Fig. 2, and looking in the direction of the frame. Fig. 4 is a perspective view showing the plunger detached. Fig. 5 is a horizontal sectional view taken on the line 5—5 in Fig. 1. Fig. 6 is a horizontal sectional view taken on the line 6—6 in Fig. 1. Fig. 7 is a sectional view taken on the line 7—7 in Fig. 1.

Corresponding parts in the several figures are denoted by like characters of reference.

The frame or body of the improved planter is composed of side members 15, 16 which are connected and spaced apart at their lower end portions by means of plates 17; near their upper ends by a bolt 18 having a spacing member or sleeve 19, and intermediate their upper and lower ends by the side walls 20 of the hopper H, said hopper being formed of a metallic plate, bent to an approximate U-shape and having its side walls secured on the frame members 15, 16 by fastening means, such as nails or screws 21. The bottom of the hopper is formed by a bracket 22 which is connected with and extends outwardly from the frame member 15, said bracket being longitudinally grooved for the accommodation of the seed slide 23, which latter extends through an aperture 24 in the frame member 16. The seed slide has an opening or seed cup 25, the area of which may be varied by proper adjustment of a regulating slide 26 which is adjustably secured on the seed slide by means of a screw 27 extending through a slot 28 in the regulating slide. A block 29 secured on the frame member 15 above the bracket 22 has a recess 30 wherein is mounted a cut-off brush 31, the function of which is to wipe superfluous seeds from the seed cup when the seed slide is retracted. An obliquely disposed guide member or deflector 32 connects the forward portion of the block 29 with the front face of the frame member 15 for the purpose of guiding the seeds contained in the hopper in the direction of the seed cup. The bracket 22 which constitutes the bottom of the hopper has an opening 33 communicating with the upper end of a spout 34 which is mounted on the front face of the frame member 15, said frame member having a groove 35 which coöperates with the spout 34 to form the seed duct.

The frame member 16 carries at its lower end a valve box or casing C consisting of a plate 36 having side flanges 37 between which a valve 38 is pivotally mounted at the upper front corners of said flanges. Attached to the valve 37 is a flat arcuate spring 39, the free end of which engages the front face of the spout 34, thereby keeping the valve normally in a closed or obstructing position by pressing the lower edge of said valve against the plate 36 between the flanges 37. The lower edges of the plate 36 and flanges 37 are made sharp so as to readily enter into the ground.

Mounted for vertical slidable movement between the frame members 15, 16 is a plunger 40 having at its upper end a handle 41. The plunger is provided with a transverse slot 42 through which the seed slide 23 is guided, said slide being engaged by an obliquely disposed rod 43 which is positioned between the side walls of the slot through which said rod extends, the upper and lower ends of said rod being provided with offsets 44 which are secured on opposite faces of the plunger. The rod 43 extends through an aperture 45 in the seed slide, and it follows that when the plunger is reciprocated vertically, a transverse reciprocatory motion will be imparted to the seed slide. The plunger 40 is also provided with a slot 46 for the passage of the connecting bolt 18 and spacing sleeve 19, the movements of the plunger in an upward and downward direction being limited by the length of the slot 46. The lower end of the plunger has a shoe 47 which extends between the side flanges 37 of the valve box, and it follows that on its downward movement the said plunger will force open the valve.

The parts are so arranged and proportioned that when the plunger reaches the downward limit of its movement, the bottom of the shoe 47 will be in alinement with or slightly below the lower edge of the valve chamber. When the plunger is at the upward limit of its movement the outlet from the seed duct to the valve chamber will be unobstructed. The lower end of the plunger is to be shod with iron or other metal, as seen at 48', to resist wear.

The frame members 15 and 16 are provided in their opposed faces with grooves 48 for the accommodation of the obliquely disposed rod 43. The valve chamber C is so mounted on the frame member 16 that the lower end of said frame member will constitute a shoulder or offset 49, which, by engagement with the surface of the ground, will limit the downward thrust or movement of the device, thereby enabling seed to be planted at a predetermined depth.

In the operation of this device, the operator grasps the handle 41 of the plunger which when pulled upward will retract the seed slide until the seed cup or aperture 25 is in registry with the upper end of the seed duct. By this retracting movement a charge of seed is deposited in the seed duct from whence it is conveyed to the valve chamber with which it is in unobstructed communication, owing to the raised position of the plunger. By forcing the lower end of the device into the ground, the valve chamber will enter into the ground until obstructed by the shoulder or offset 49. The plunger 40, continuing its downward course, will force open the valve 38, and force the charge of seed into the ground where it remains when the device is lifted by upward strain on the handle 41. Such upward strain will be productive of an upward movement of the plunger relatively to the frame of the device which gravitationally assists the relative movement of the parts. In the meantime, the downward movement of the plunger has resulted in projecting the seed slide for the reception of another charge of seed from the hopper, and the lifting movement of the plunger again retracts the slide and deposits a fresh charge of seed into the seed duct, whereby it is carried to the valve chamber, thereby making the device ready for a repetition of the operation. The seed may be covered by the foot of the operator pressing the soil thereon as he advances to the next hill. This, however, will rarely be necessary, because the soil will almost invariably fall into the opening made by the planter when the planter is raised from the ground, thus covering the seed sufficiently.

It will be seen from the foregoing that I have produced a hand corn planter of very simple and effective construction which is capable of being manipulated by one hand and with little strain on the operator. The construction is simple and inexpensive, and the device has been found to be thoroughly practical and useful for the purposes for which it is intended.

Having thus described the invention, what is claimed as new, is:—

1. In a hand corn planter, a frame comprising side members and a hopper, means for connecting together and spacing apart the side members, said means including a bolt extending transversely through the side members near their upper ends and having a spacing sleeve interposed between said side members, plates secured externally on the side members and the walls of the hopper, said walls being also secured externally on the side members, a plunger mounted for vertical reciprocation between the side members, said plunger having a vertical slot engaging the spacing sleeve and whereby the plunger is guided and its movement is limited, said plunger having also a vertical slot through which passes an obliquely disposed rod, the terminals of which have offsets secured on opposite faces of the plunger; the side members of the frame being provided with recesses in their opposed faces wherein the offset portions of the oblique rod are guided; and a seed slide arranged for horizontal reciprocation through the hopper and through the frame members, said slide having an aperture for the passage of the oblique rod whereby it is actuated.

2. In a hand corn planter of the class described, a frame comprising side members permanently connected together and spaced apart, a hopper connected with one of the side members, a seed slide arranged for reciprocation transversely through the hopper and the side members, a slide actuating plunger mounted for vertical reciprocation between the side members of the frame and having a shoe at its lower end, a valve casing mounted at the lower end of the frame, a seed duct connecting the valve casing with the hopper, a valve hinged in the casing and adapted to be actuated by the plunger shoe, and an actuating spring for the valve, said spring being secured on the valve and extended upwardly to impinge on the external face of the seed duct.

NATHAN E. BEVERLY.

Witnesses:
W. M. BEVERLY,
S. P. DOERIS.

Copies of this patent may be obtained for five cents each, by addressing the "Commissioner of Patents, Washington, D. C."